United States Patent
Clum et al.

(10) Patent No.: US 10,767,490 B2
(45) Date of Patent: Sep. 8, 2020

(54) HOT SECTION ENGINE COMPONENTS HAVING SEGMENT GAP DISCHARGE HOLES

(71) Applicant: United Technologies Corporation, Farmington, CT (US)

(72) Inventors: Carey Clum, East Hartford, CT (US); Dominic J. Mongillo, Jr., West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 263 days.

(21) Appl. No.: 15/699,303

(22) Filed: Sep. 8, 2017

(65) Prior Publication Data

US 2019/0078441 A1 Mar. 14, 2019

(51) Int. Cl.
*F01D 5/18* (2006.01)
*B23P 15/02* (2006.01)

(52) U.S. Cl.
CPC .............. *F01D 5/186* (2013.01); *B23P 15/02* (2013.01); *F01D 5/187* (2013.01); *F05D 2230/00* (2013.01); *F05D 2240/122* (2013.01); *F05D 2240/304* (2013.01); *F05D 2260/202* (2013.01); *F05D 2260/2214* (2013.01); *F05D 2260/22141* (2013.01)

(58) Field of Classification Search
CPC .............. F05D 2230/31; F05D 2230/21; F05D 2260/20; F05D 2260/202; F05D 2260/22141; F05D 2260/2214; F01D 9/065; F01D 5/187–189
See application file for complete search history.

(56) References Cited

U.S. PATENT DOCUMENTS 4,446,693 A * 5/1984 Pidcock .................. F23R 3/002
 60/757
5,931,638 A * 8/1999 Krause .................... F01D 5/186
 415/115

(Continued)

FOREIGN PATENT DOCUMENTS

EP 0937946 A2 8/1999
EP 1990507 A1 11/2008
EP 3056816 A1 8/2016

OTHER PUBLICATIONS

European Search Report from the European Patent Office for Application No. 18193529.7; Date of Completion: Dec. 21, 2018; dated Jan. 9, 2019; 6 Pages.

*Primary Examiner* — Igor Kershteyn
*Assistant Examiner* — Andrew Thanh Bui
(74) *Attorney, Agent, or Firm* — Cantor Colburn LLP

(57) ABSTRACT

Components for gas turbine engines and methods of making the same, the components including a component body having an external side wall and an internal side wall and defining at least a first cooling cavity and a second cooling cavity between the external side wall and the internal side wall, at least one segmented rib extending within the component body and separating the first cooling cavity from the second cooling cavity, wherein the first and second cooling cavities, the at least one segmented rib comprising at least two rib segments separated by a segment gap, and a discharge hole formed in the external side wall fluidly connected the segment gap to an exterior surface of the component body.

19 Claims, 8 Drawing Sheets

(56) References Cited

U.S. PATENT DOCUMENTS

| | | | | |
|---|---|---|---|---|
| 6,257,830 B1* | 7/2001 | Matsuura | ................ | F01D 5/147 |
| | | | | 415/115 |
| 6,514,037 B1* | 2/2003 | Danowski | ............... | F01D 5/186 |
| | | | | 415/115 |
| 7,232,290 B2 | 6/2007 | Draper et al. | | |
| 7,780,415 B2* | 8/2010 | Liang | ..................... | F01D 5/186 |
| | | | | 415/115 |
| 8,881,397 B1* | 11/2014 | Dowd | ....................... | F01D 5/14 |
| | | | | 164/512 |
| 9,429,027 B2 | 8/2016 | Mongillo, Jr. et al. | | |
| 2005/0265839 A1 | 12/2005 | Mongillo et al. | | |
| 2015/0285097 A1 | 10/2015 | Spangler et al. | | |

\* cited by examiner

HOT SECTION ENGINE COMPONENTS HAVING SEGMENT GAP DISCHARGE HOLES

BACKGROUND

Illustrative embodiments pertain to the art of turbomachinery, and specifically to hot section engine components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, components for gas turbine engines are provided. The components include a component body having an external side wall and an internal side wall and defining at least a first cooling cavity and a second cooling cavity between the external side wall and the internal side wall, at least one segmented rib extending within the component body and separating the first cooling cavity from the second cooling cavity, wherein the first and second cooling cavities, the at least one segmented rib comprising at least two rib segments separated by a segment gap, and a discharge hole formed in the external side wall fluidly connected the segment gap to an exterior surface of the component body.

In addition to one or more of the features described herein, or as an alternative, further embodiments of the components may include that the at least one segmented rib comprises at least three rib segments and at least two segments gaps between the rib segments, the airfoil comprising at least one discharge hole located at each of the segment gaps.

In addition to one or more of the features described herein, or as an alternative, further embodiments of the components may include that the at least one segmented rib comprises a plurality of segmented ribs, and the component body comprises at least one additional cooling cavity.

In addition to one or more of the features described herein, or as an alternative, further embodiments of the components may include that the discharge hole is angled relative to the exterior surface of the component body.

In addition to one or more of the features described herein, or as an alternative, further embodiments of the components may include that the component body is a body of an airfoil or a blade outer air seal.

In addition to one or more of the features described herein, or as an alternative, further embodiments of the components may include that a portion of cooling air within the first cooling cavity and a portion of cooling air within the second cooling cavity are ejected from a respective cooling cavity through the discharge hole.

In addition to one or more of the features described herein, or as an alternative, further embodiments of the components may include that the component body is an airfoil body and the external side wall is at least one of a pressure sidewall and a suction sidewall of the airfoil body.

In addition to one or more of the features described herein, or as an alternative, further embodiments of the components may include that the component body is an airfoil body and at least one of the first cooling cavity and the second cooling cavity fluidly discharges out of a tip of the airfoil body.

In addition to one or more of the features described herein, or as an alternative, further embodiments of the components may include that the segment gap has a radial gap size h, the rib segments have a local thickness t, and the discharge hole has a hydraulic diameter Dh, and the radial gap size h is defined as $2t \leq h \leq 4t$ or $2Dh \leq h \leq 4Dh$.

In addition to one or more of the features described herein, or as an alternative, further embodiments of the components may include that the component body is a blade outer air seal body and the external side wall is a hot wall of the blade outer air seal body.

In addition to one or more of the features described herein, or as an alternative, further embodiments of the components may include that the component body is a body of an airfoil, a blade outer air seal, a combustor panel, or other hot section engine component.

According to some embodiments, methods of manufacturing components for gas turbine engines are provided. The methods include forming a component body having an external side wall and an internal side wall, forming at least one segmented rib within the component body, the at least one segmented rib separating a first cooling cavity from a second cooling cavity within the component body, wherein the first cooling cavity and the second cooling cavity are defined between the external side wall and the internal side wall, the segmented rib comprising at least two rib segments separated by a segment gap, and forming a discharge hole in the external side wall to fluidly connect the segment gap to an exterior surface of the component body.

In addition to one or more of the features described herein, or as an alternative, further embodiments of the methods may include that the at least one segmented rib comprises at least three rib segments and at least two segments gaps between the rib segments, the method comprising forming at least one discharge hole at each of the segment gaps.

In addition to one or more of the features described herein, or as an alternative, further embodiments of the methods may include that the at least one segmented rib comprises a plurality of segmented ribs, and the component body is formed with at least one additional cooling cavity.

In addition to one or more of the features described herein, or as an alternative, further embodiments of the methods may include that the discharge hole is angled relative to the exterior surface of the component body.

In addition to one or more of the features described herein, or as an alternative, further embodiments of the methods may include that the component body is a body of an airfoil or a blade outer air seal.

In addition to one or more of the features described herein, or as an alternative, further embodiments of the methods may include that a portion of cooling air within the first cooling cavity and a portion of cooling air within the second cooling cavity are ejected from a respective cooling cavity through the discharge hole.

In addition to one or more of the features described herein, or as an alternative, further embodiments of the methods may include that the component body is an airfoil body and the external side wall is at least one of a pressure sidewall and a suction sidewall of the airfoil body.

In addition to one or more of the features described herein, or as an alternative, further embodiments of the methods may include that at least one of the first cooling cavity and the second cooling cavity fluidly discharges out of a tip of the component body.

In addition to one or more of the features described herein, or as an alternative, further embodiments of the methods may include that the component body is formed using at least one of fugitive core technologies and additive manufacturing processes.

In addition to one or more of the features described herein, or as an alternative, further embodiments of the methods may include that the segment gap has a radial gap size h, the rib segments have a local thickness t, and the discharge hole has a hydraulic diameter Dh, and the radial gap size h is defined as 2t≤h≤4t or 2Dh≤h≤4Dh.

In addition to one or more of the features described herein, or as an alternative, fur further embodiments of the methods may include that the component body is a body of an airfoil, a blade outer air seal, a combustor panel, or other hot section engine component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
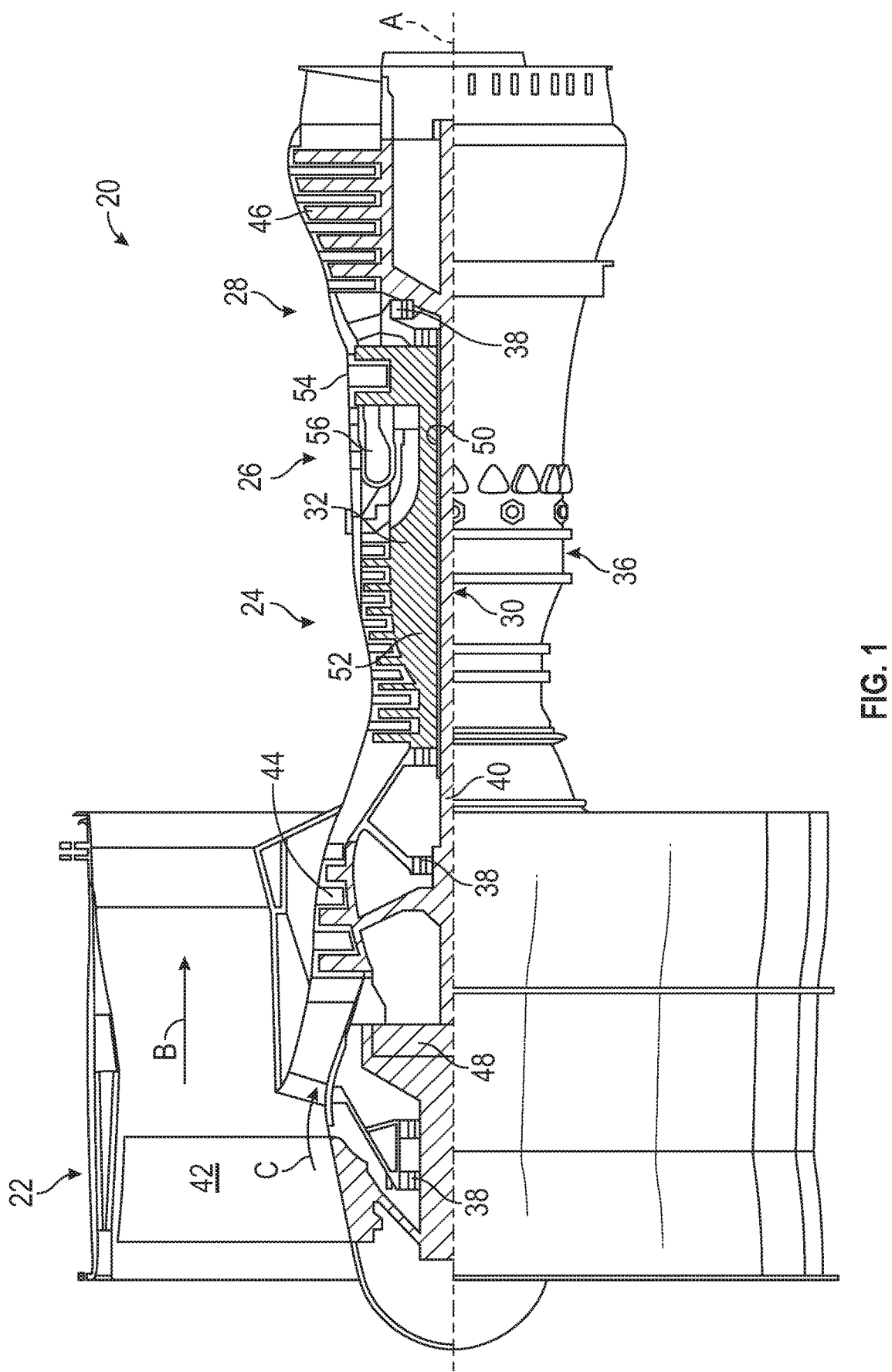
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
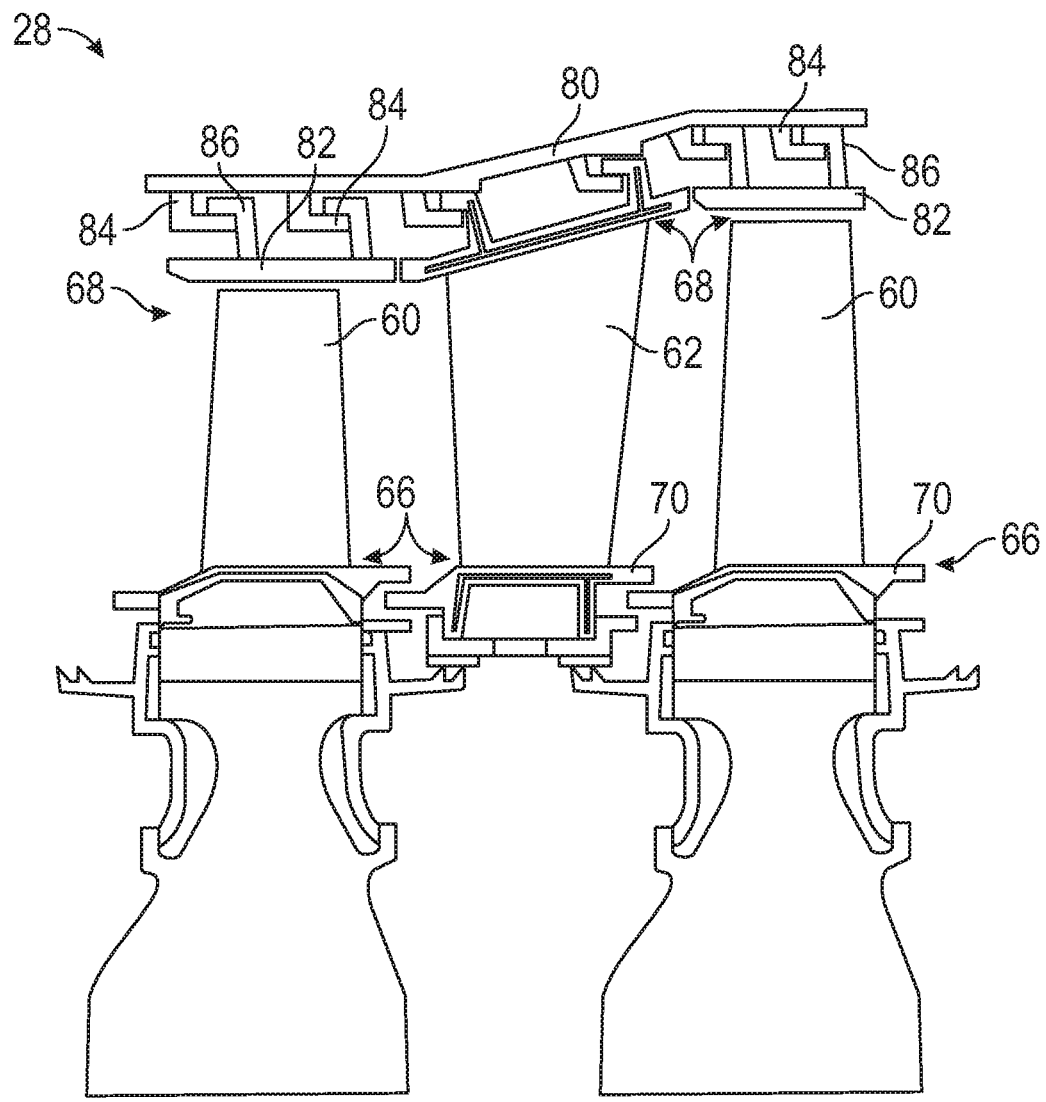
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
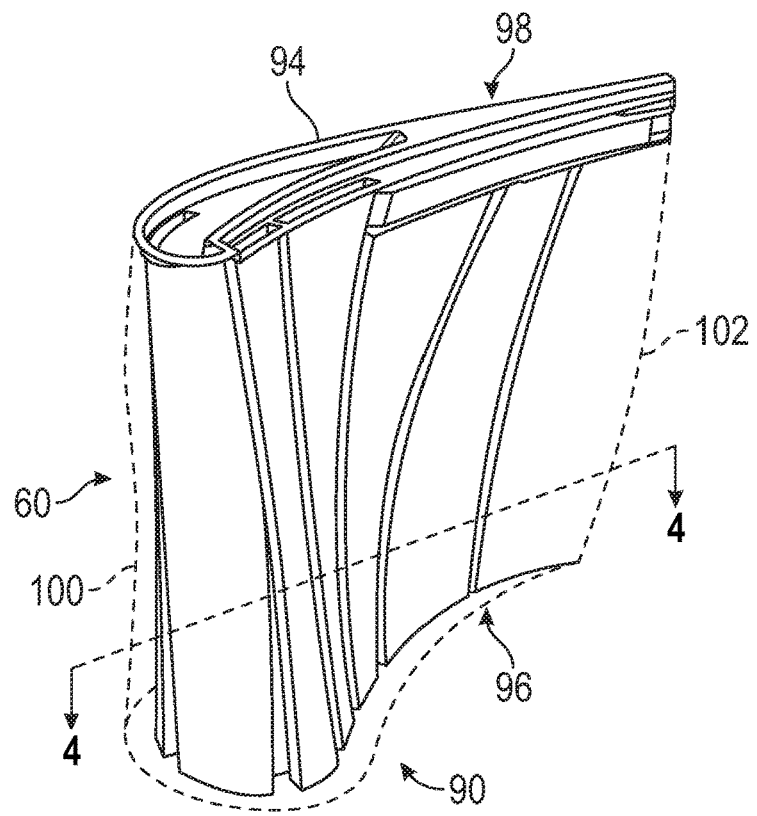
FIG. 3 is a perspective view of an airfoil that can incorporate embodiments of the present disclosure.
Figure 4:
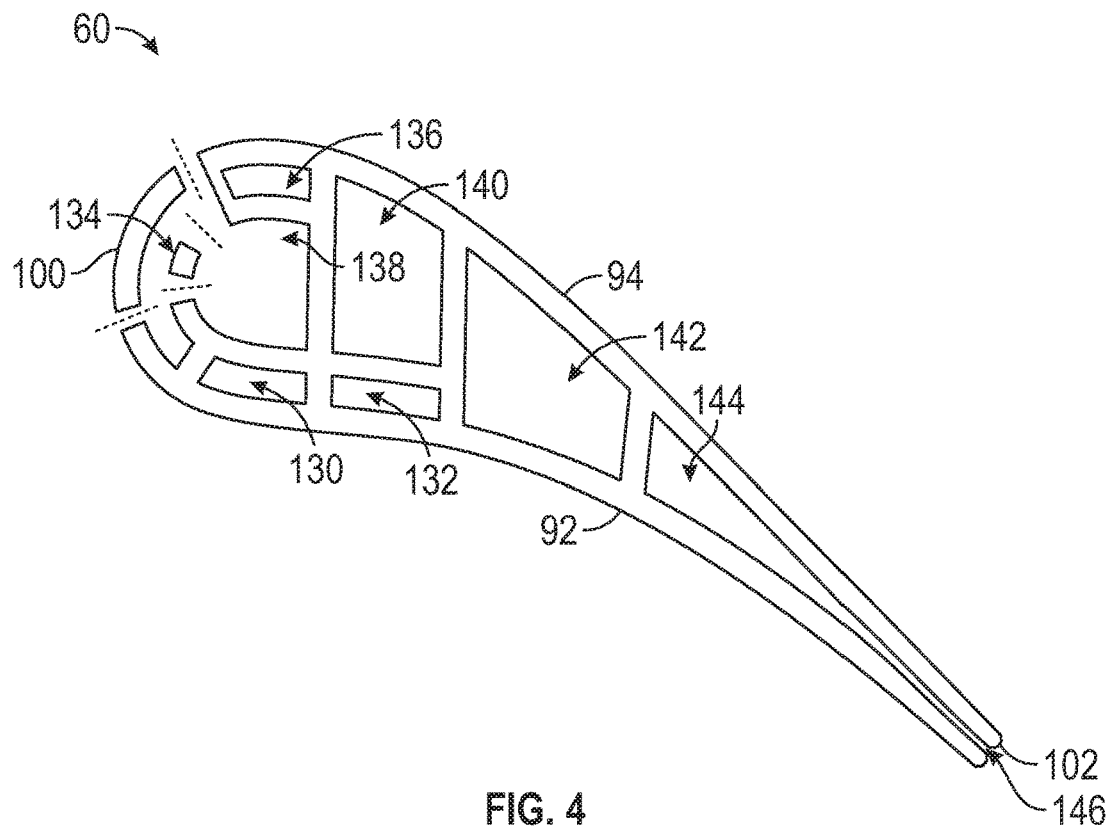
FIG. 4 is a partial cross-sectional view of the airfoil of FIG. 3 as viewed along the line 4-4 shown in FIG. 3.

As shown in FIGS. 3-4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially from the root region 96 to the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to the engine axis) between the leading edge 100 and the trailing edge 102. Each of the root region 96 and the tip region 98 extend from the leading edge 100 to the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis). The airfoil 60 may be a blade or vane, and have various other features associated with such configurations, e.g., platforms, tip surfaces, etc.

As shown in FIG. 4, illustrating a cross-sectional view of the airfoil 60 as viewed along the line 4-4 shown in FIG. 3, the airfoil body 90 defines or includes a plurality of internal cavities to enable cooling of the airfoil 60. For example, as shown, the airfoil 60 includes a plurality of forward and side cooling cavities 130, 132, 134, 136, 138. In the relative middle of the airfoil body 90, the airfoil 60 includes various serpentine flow cavities 140, 142, 144 and, at the trailing edge 102, a trailing edge slot 146. The most aftward (aft-flowing) serpentine flow cavity 144 defines a serpentine trailing edge core that fluidly connects to the trailing edge slot 146 that is formed at the trailing edge 102. In the present illustration, a first serpentine cavity 140 may arranged for flow in a first direction (e.g., an up pass cooling flow), a second serpentine cavity 142 may be arranged for flow in a second direction (e.g., a down pass cooling flow), and a third serpentine cavity 144 may be arranged for flow in the first direction and/or a third direction (e.g., an up pass cooling flow that exits the airfoil 60 through the trailing edge slot 146). Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

When cooling cavities are positioned along an airfoil hot surface (e.g., exterior surface, such as cooling cavities 130, 132, 134, 136) there may be a panel length maximum limit in the core structures to form such cooling cavities. To accommodate such limits, incorporation of predominantly radially oriented segmented rib features may be utilized to provide increased stiffness to manage adverse thermal and/or mechanical strains that can result due to the differential in metal temperature that occurs between the external "hot wall" and internal "cold wall." While the segmentation of the radially oriented ribs provide flow and pressure connectivity between adjacent radially oriented hybrid skin core cooling cavities, the discontinuities that result from the segmented rib features produce regions of local flow recirculation and separation resulting in low or poor backside convective cooling. Although the connections or gaps that are formed by the segmented rib features between adjacent hybrid skin core cooling cores in a radial direction (e.g., extending from the root to the tip) may be beneficial for core producibility, internal pressure balance, and flow redistribution perspective, such connection or gaps can cause dead zones within the cooling passages of the airfoil that have low heat transfer characteristics, thus causing hot metal temperatures which can lead to part life reduction. These hot metal temperatures (at the connections/gaps) are adjacent to cold metal temperatures because of the high heat transfer augmentation in an adjacent cooling cavity. Such high temperature differentials can cause thermal mechanical fatigue (TMF) cracks in the structure of the airfoil body. The thermal mechanical fatigue (TMF) cracks can connect along the body of the airfoil and cause early failure and/or removal of airfoil. Further, the dead zone affect can be exacerbated or exaggerated when film hole exits are placed adjacent to these dead zones. Moreover, typically, placing film holes in these locations is not possible because there is not enough back strike distance available for current hole drill manufacturing processes due to true position tolerance variations.

Embodiments of the present disclosure are directed to the utilization of advanced additive manufacturing methods and/or fugitive core casting processes to create, produce, and/or form cooling purge holes (e.g., film holes) located at the connections/gap in order to eliminate the dead zone and/or to pull flow from a connected cavity. Such arrangements, in accordance with embodiments of the present disclosure, can drive heat transfer up at the locations of the dead zones and thus eliminate hot zones that would typically be formed at such locations. Such arrangements will reduce or eliminate the formation of thermal mechanical fatigue (TMF) cracks and increase durability of an airfoil made in accordance with the present disclosure. In some embodiments, typical film hole exits may be eliminated from the connecting zone to provide further thermal efficiency benefits.

Figure 5:
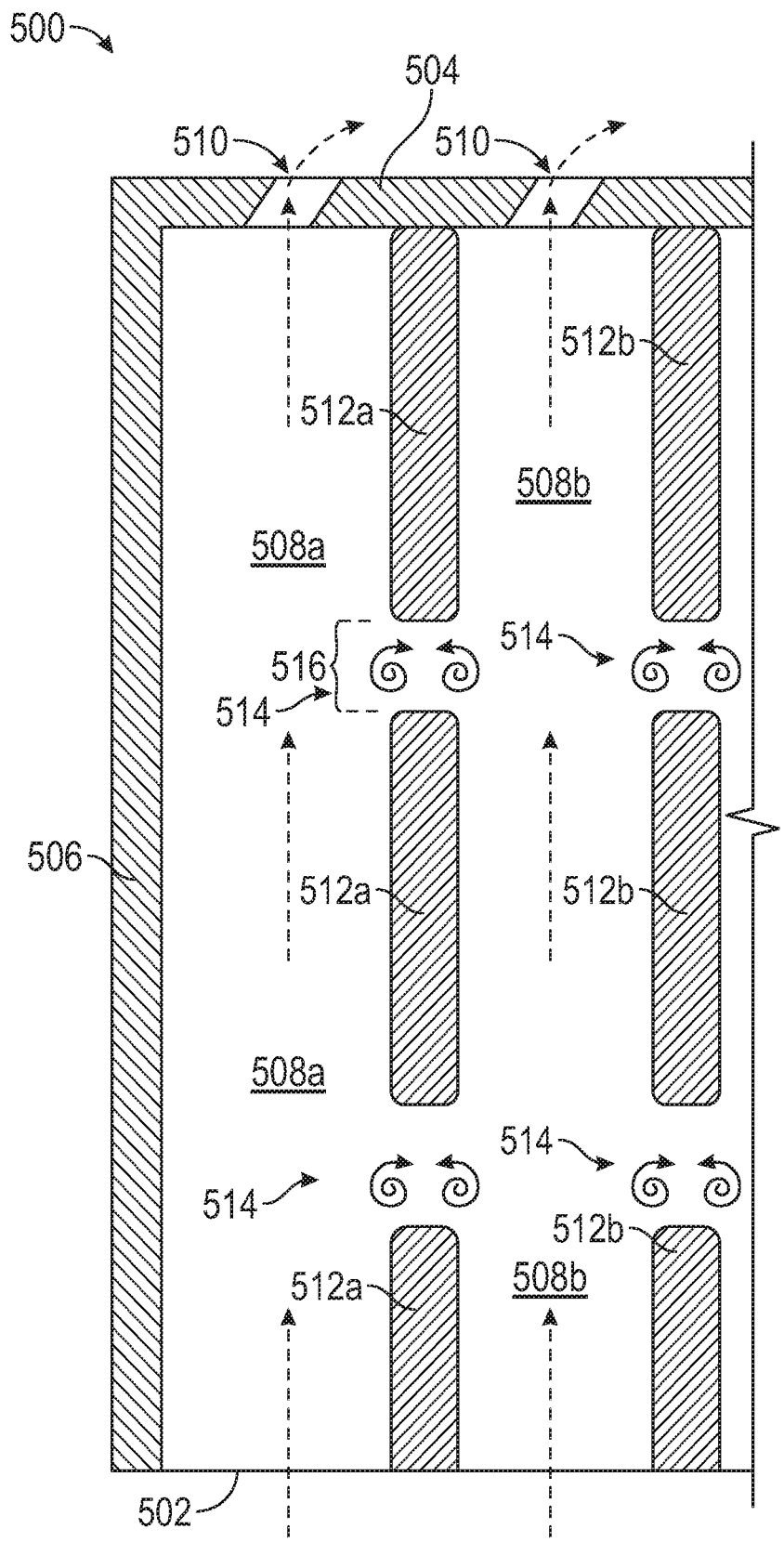
FIG. 5 is a schematic illustration of an airfoil that can be modified in accordance with embodiments of the present disclosure.

Turning now to FIG. 5, a partial schematic illustration of a portion of an airfoil 500 is shown. The illustration of the airfoil 500 shown in FIG. 5 is a partial illustration of the airfoil 500 extending from a root 502 to a tip 504 and having a leading edge 506. The airfoil 500, in this illustration, includes two hot-side predominantly radially hybrid skin core cooling cavities 508a, 508b that provide high internal convective cooling to a hot side of the airfoil 500. For example, the hybrid skin core cooling cavities 508a, 508b may be substantially similar to cooling cavities 130, 132 shown in FIG. 4. The hybrid skin core cooling cavities 508a, 508b extend radially from the root 502 to the tip 504 of the airfoil. A cooling flow can enter the hybrid skin core cooling cavities 508a, 508b at the root 502, flow radially outward toward the tip 504, and then exit the hybrid skin core cooling cavities 508a, 508b at the tip 504 through one or more tip film holes 510 that can generate a film along an exterior surface of the tip region 504 of the airfoil 500.

The predominantly radially oriented hybrid skin core cooling cavities 508a, 508b are divided by a segmented rib 512a (comprising a plurality of rib segments). The segmented rib 512a extends radially within the airfoil 500 from the root 502 to the tip 504 and defines, in part, cavity walls of the hybrid skin core cooling cavities 508a, 508b. As schematically shown, a first hybrid skin core cooling cavity 508a is defined, in part, by a wall of the leading edge 506 (or a wall of a leading edge cavity as shown in FIG. 4) and a first segmented rib 512a. A second hybrid skin core cooling cavity 508b is defined, in part, by the first segmented rib 512a and a second segmented rib 512b. The first and second hybrid skin core cooling cavities 508a, 508b are further defined by a hot exterior wall of the airfoil 500 (e.g., a wall of pressure side 92 shown in FIG. 4) and interior cold walls (e.g., adjacent interior cavities, such as serpentine cavities). The segmented ribs 512a, 512b can provide heat transfer augmentation, depending on the orientation and/or arrangement of the segmented ribs 512a, 512b within the airfoil 500. Further, the segmented ribs 512a, 512b can provide stiffening and/or conduction paths between various locations on/in the airfoil 500 (e.g., conduction between a hot external surface and a cold internal surface).

The segmented ribs 512a, 512b can enable internal flow redistribution within and between the radially oriented hybrid skin core cooling cavities 508a, 508b. In this sense, the segmented ribs 512a, 512b allow for internal pressures within each of the radially extending hybrid skin core cooling cavities 508a, 508b. Additionally, the segmented ribs 512a, 512b enable the design of the airfoil 500 to be more robust if one of the hybrid skin core cooling cavities 508a, 508b becomes compromised due to external through-wall oxidation and/or through-wall cracking resulting from thermal mechanical fatigue. However, the segmented ribs 512a, 512b can cause areas of flow disruption 514. That is, segment gaps 516 that exist between adjacent sections of the segmented ribs 512a, 512b can enable turbulent and/or disruptive cooling flow, which can cause increased thermal temperatures of the material of the airfoil 500 at the location of the segment gaps 516. Such increased thermal temperatures (and associated thermal gradients) may be created by poor internal backside convection in the regions between adjacent portions of the segmented ribs 512a, 512b (e.g., segment gaps 516) due to internal flow separation and recirculation (flow disruption 514). Accordingly, it may be desirable to mitigate these zones of flow disruption 514 (e.g., "poor" internal flow quality and low convective heat transfer).

Figure 6:
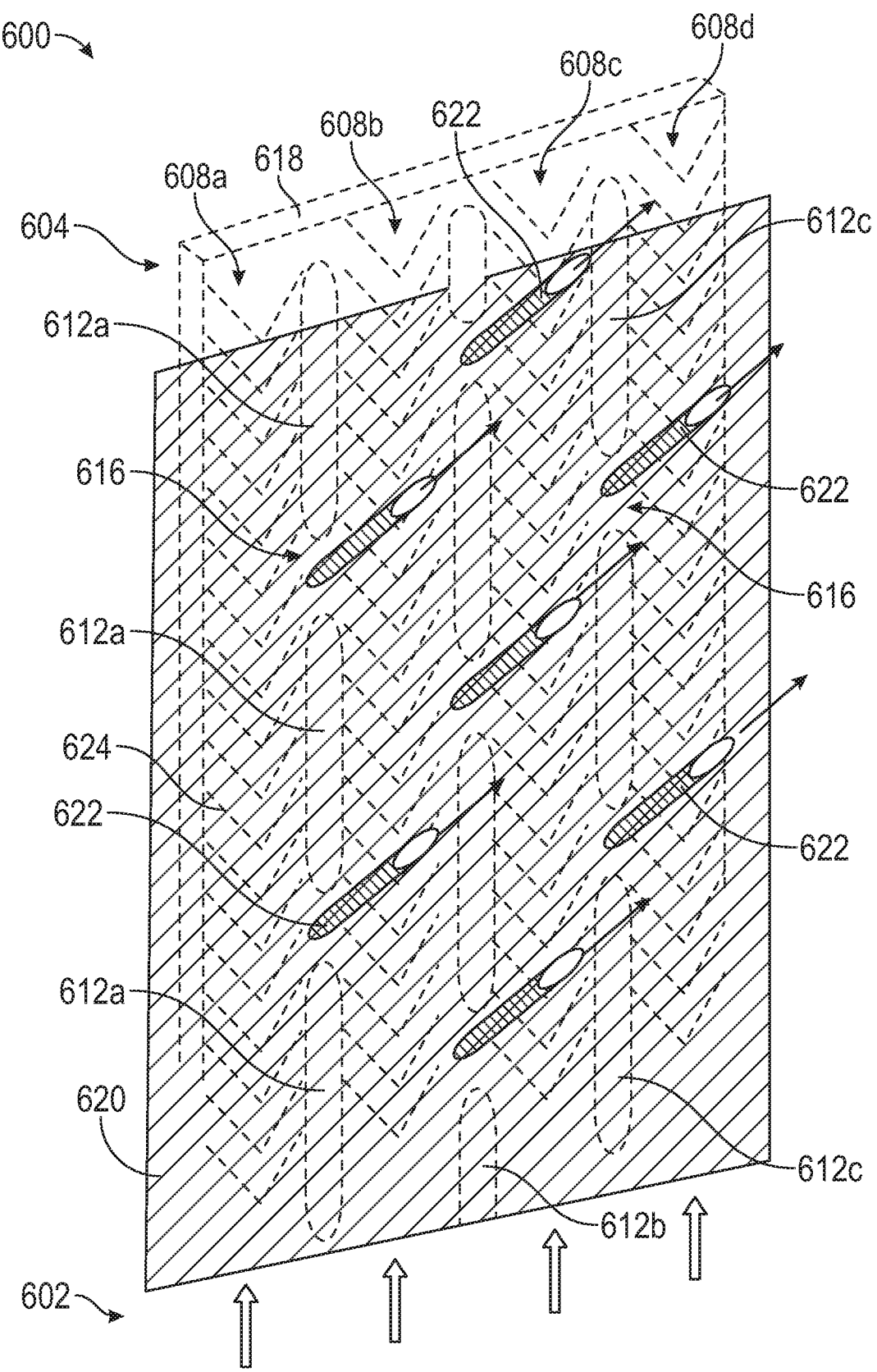
FIG. 6 is a schematic illustration of an airfoil in accordance with an embodiment of the present disclosure.

Turning now to FIG. 6, a schematic illustration of an airfoil 600 in accordance with an embodiment of the present disclosure is shown. The airfoil 600 may be similar to that shown and described above. For example, as shown in FIG. 6, the airfoil 600 includes a plurality of radially extending hybrid skin core cooling cavities 608a, 608b, 608c, 608d extending from a root 602 to a tip 604 of the airfoil 600. The hybrid skin core cooling cavities 608a, 608b, 608c, 608d are separated in a chordwise (e.g., leading edge to trailing edge) direction by a plurality of segmented ribs 612a, 612b, 612c (each comprising two or more rib segments). The segmented ribs 612a, 612b, 612c have segment gaps 616 between the rib segments thereof, which can cause flow disruption, as described above. The illustration in FIG. 6 also shows an internal (cold) side wall 618 and an external (hot) side wall 620. In some embodiments, the external side wall 620 may be a pressure side or suction side wall of the airfoil 600.

As schematically shown in FIG. 6, a plurality of discharge holes 622 are arranged within or passing through the external side wall 620. The location of the discharge holes 622 are such that an interior end of the discharge hole 622 is located at the position of a segment gap 616 between radially adjacent rib segments of the segmented ribs 612a, 612b, 612c. The discharge holes 622 then extend through the material of the external side wall 620 and exit at a location on the exterior surface of the external side wall 620. As such, the discharge holes 622 can be film cooling holes that extract cooling air from the hybrid skin core cooling cavities 608a, 608b, 608c, 608d at the location of the segment gaps 616. In some embodiments, the discharge holes 622 can be arranged to be normal to the external surface of the external side wall 620 and in other embodiments, the discharge holes 622 can be angled relative to the external surface of the external side wall 620. The discharge holes 622 are arranged to extract, discharge, or bleed cooling air from the hybrid skin core cooling cavities 608a, 608b, 608c, 608d to the exterior of the airfoil 600. The discharge holes 622 can have various geometric shapes. For example, the discharge holes 622 may be cylindrical in shape, tapered, conical, elliptical, squared, stepped (e.g., increasing or decreasing diameter cylindrical sections, increasing or decreasing boxed sections (e.g., similar to a conical structure but with discrete sections rather than a smooth cone, etc.)), etc.

The discharge holes 622 can improve internal flow cooling characteristics within the hybrid skin core cooling cavities 608a, 608b, 608c, 608d by drawing internal coolant toward and through the segment gaps 616. It is noted that with current casting and manufacturing tolerances it may be very difficult to ensure the location of the discharge holes 622 are appropriately positioned at the segment gaps 616 between the rib segments of the segmented ribs 612a, 612b, 612c. However, in accordance with some embodiments of the present disclosure, utilizing advanced fugitive core technologies and/or additive manufacturing processes, the relative positions between the discharge holes 622 and the segment gaps 616 can be ensured to be consistently and accurately located. Thus, with properly aligned discharge holes 622, proper functionality of a purge flow (through discharge holes 622) can be ensured, thus eliminating regions of separated and recirculated flow (e.g., flow disruption 514 shown in FIG. 5).

Also shown in FIG. 6, the structure defining the hybrid skin core cooling cavities 608a, 608b, 608c, 608c can have various internal flow augmentation features 624. For example, the flow augmentation features 624 can be trip strips (e.g., normal, chevron strips, skewed strips, segmented skewed strips). Further, those of skill in the art will appreciate that other types of flow augmentation features can be employed with departing from the scope of the present disclosure, including, but not limited to pedestals and/or pin fins.

Figure 7:
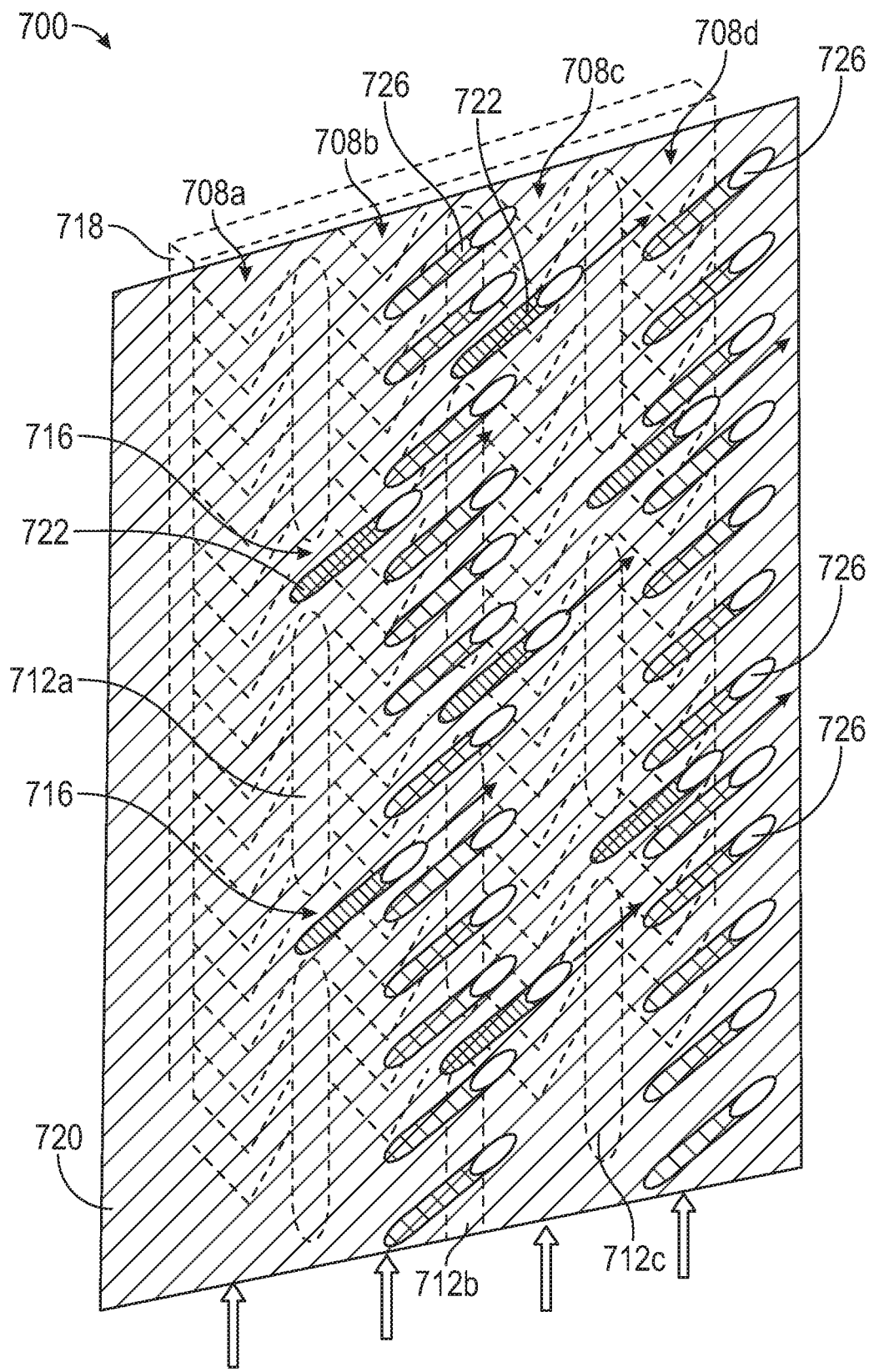
FIG. 7 is a schematic illustration of an airfoil in accordance with an embodiment of the present disclosure.

Turning now to FIG. 7, a schematic illustration of an airfoil 700 in accordance with an embodiment of the present disclosure is shown. The airfoil 700 is substantially similar to that shown in FIG. 6, and thus like features may not be described again. The airfoil 700 includes an external side wall 720 and an internal side wall 718 with a plurality of hybrid skin core cooling cavities 708a, 708b, 708c, 708d. Radially extending segmented ribs 712a, 712b, 712c separate the hybrid skin core cooling cavities 708a, 708b, 708c, 708d. Segment gaps 716 separate the individual rib segments of the respective segmented ribs 712a, 712b, 712c.

As shown, the airfoil 700 includes discharge holes 722 located at the segment gaps 716, to allow for cooling air within the hybrid skin core cooling cavities 708a, 708b, 708c, 708d to bleed out from the hybrid skin core cooling cavities 708a, 708b, 708c, 708d and to an external surface of the airfoil 700. Further, as shown, one or more of the hybrid skin core cooling cavities 708a, 708b, 708c, 708d is configured with film holes 726. The film holes 726 can be incorporated in to the body of the airfoil 700 at each of the hybrid skin core cooling cavities 708a, 708b, 708c, 708d and/or any combination thereof. The location, number, orientation, etc. of the film holes 726 depending on external heatload, flow, and durability life requirements.

The outlets of the discharge holes 722 and the film holes 726 can be axially and/or radially offset relative to each other on the external surface of the airfoil 700. In other embodiments, the external outlets of the discharge holes 722 and the film holes 726 can be aligned axially and/or radially. In such embodiments, the discharge holes 722 may be integrally incorporated into the film cooling hole design configuration for the airfoil 700.

Figure 8A:
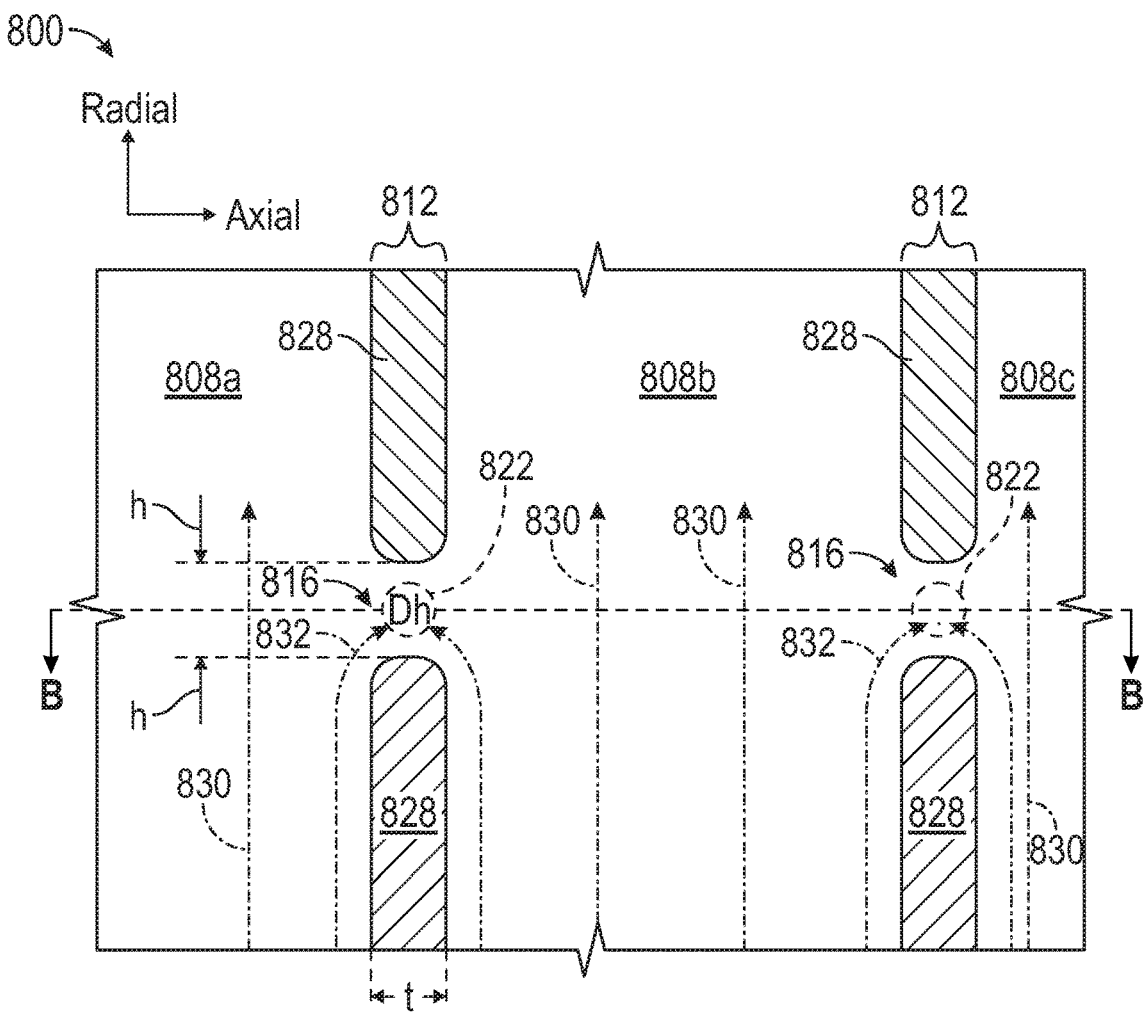
FIG. 8A is a schematic illustration of cooling cavities of an airfoil in accordance with an embodiment of the present disclosure.
Figure 8B:
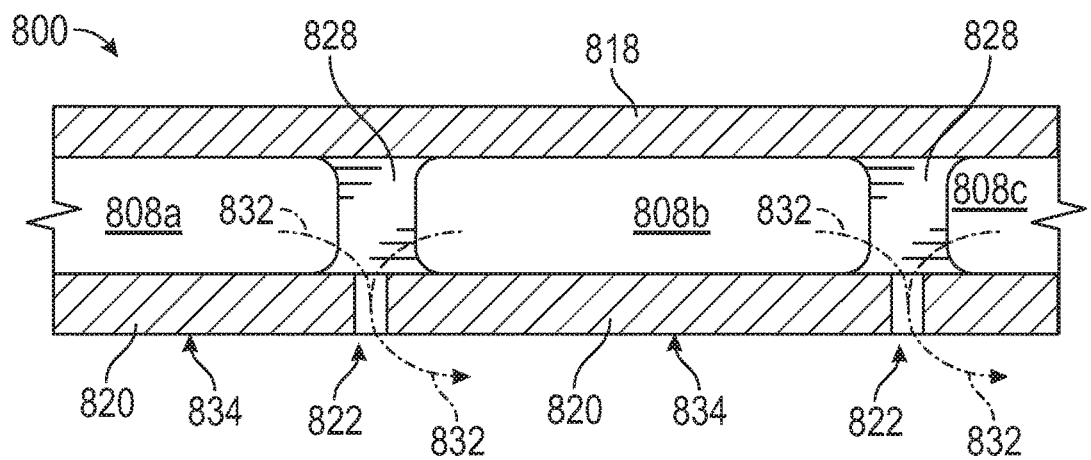
FIG. 8B is a schematic illustration of the airfoil of FIG. 8A as viewed along the line B-B shown on FIG. 8A.

Turning now to FIGS. 8A-8B, schematic illustrations of a portion of an airfoil 800 in accordance with an embodiment of the present disclosure are shown. FIG. 8A is an elevation view illustration hybrid skin core cooling cavities 808a, 808b, 808c of the airfoil 800 that are separated by rib segments 828 of segmented ribs 812. FIG. 8B is a cross-sectional view of the airfoil 800 along the line B-B shown in FIG. 8A. The rib segments 828 extend within the airfoil 800 in a general radial direction, from a root to a tip, as shown and described above. Further, the rib segments 828 span from an external side wall 820 to an internal side wall 818, as shown in FIG. 8B. The rib segments 828 are separated from each other (along a particular segmented rib 812 in a radial direction) by segment gaps 816.

The segmented gaps 819 are gaps in a radial direction along the airfoil. A radial gap size h of the segmented gaps 819 may be established based on any desirable criteria, for example, to achieve sufficient strength while maintain flow and/or cooling requirements. For example, in one non-limiting embodiment, the radial gap size h is a distance based on a local thickness t of an adjacent or proximate rib segment 828. In one such example, the radial gap size h may be calculated as: $2t \leq h \leq 4t$. In some embodiments, the radial gap size h may also be a function of a geometric criteria related to a hydraulic diameter, Dh, of a discharge hole 822. In one such example, the radial gap height h is a distance between $2Dh \leq h \leq 4Dh$.

As shown, a cooling flow 830 flows in a generally radially outward direction through the hybrid skin core cooling cavities 808a, 808b, 808c. However, as illustrated, a portion of the cooling flow will be drawn into the segment gaps 816 and ejected from the airfoil as film cooling air 832. This is achieved through use of discharge holes 822 that are aligned with the segment gaps 816 and fluidly connect the hybrid skin core cooling cavities 808a, 808b, 808c to an exterior surface 834 of the airfoil 800 to form film cooling along the exterior surface 834.

Although shown and described with respect to airfoils, embodiments of the present disclosure are applicable to various components of gas turbine engines, including, but not limited to, blade outer air seals (BOAS), blade and vane end wall platforms, combustor panels, combustor shells, fuel injection nozzles, and/or other hot section engine components. Thus, although the embodiments presented herein are specific to airfoils, such embodiments are merely intended to be illustrative and explanatory and are not intended to be limiting.

Figure 9A:
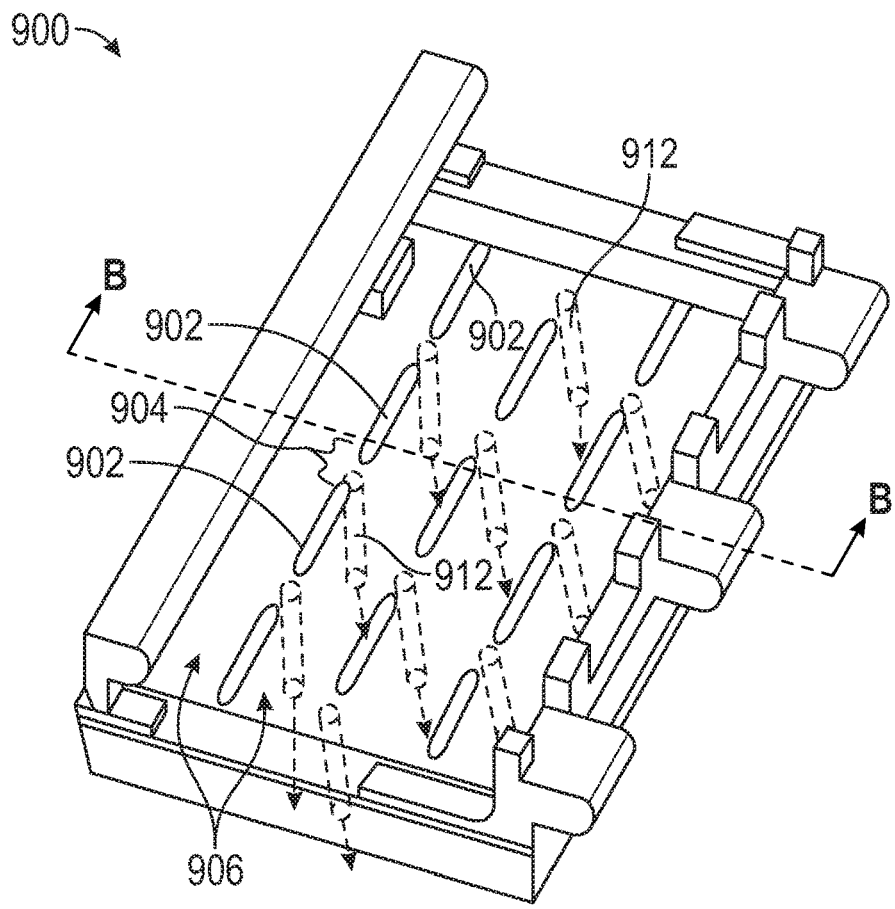
FIG. 9A is a schematic illustration of cooling cavities of a Blade Outer Air Seal (BOAS) in accordance with an embodiment of the present disclosure.
Figure 9B:
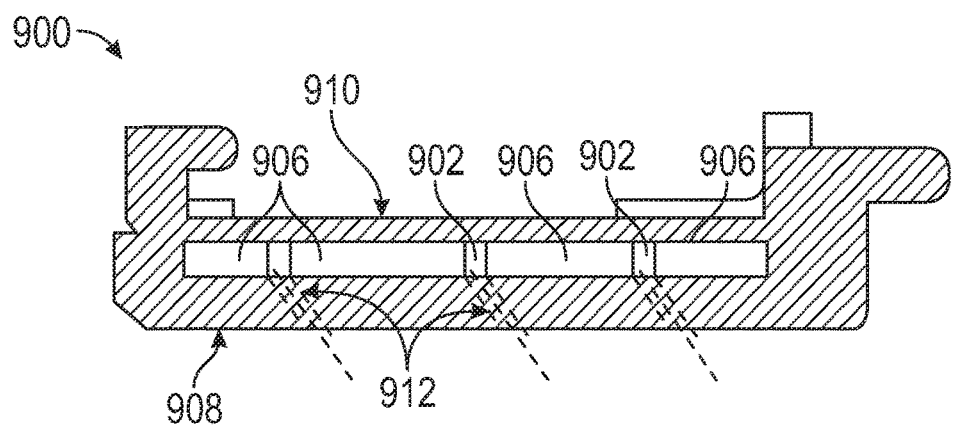
FIG. 9B is a schematic illustration of the Blade Outer Air Seal (BOAS) of FIG. 9A as viewed along the line B-B shown on FIG. 9A.

For example, turning now to FIGS. 9A-9B, a blade outer air seal (BOAS) 900 is shown having a plurality of segmented ribs 902, similar to that shown and described above. Segment gaps 904 separate individual rib segments of the respective segmented ribs 902. The segmented ribs 902 separate hybrid skin core cooling cavities 906 of the BOAS 900. In this example, the hybrid skin core cooling cavities 906 are circumferentially oriented cooling channels. FIG. 9A is an isometric illustration of the BOAS 900 and FIG. 9B is a cross-sectional view of the BOAS 900 as viewed along the line B-B shown in FIG. 9A. The segments of the segmented ribs 902 extend within the BOAS 900 in a general circumferential direction (when mounted within a turbine ending, as will be appreciated by those of skill in the art). As shown, the rib segments of the segmented ribs 902 are separated from each other (along a particular segmented rib 902 in a circumferential direction) by the segment gaps 904. As shown, the BOAS 900 has an external side wall 908 (e.g., hot wall) and an internal side wall 910 (e.g., cold wall). The external side wall 908, when installed, is exposed to a gas path through the gas turbine engine. For example, the BOAS 900 can be installed similar to that shown in FIG. 2.

Similar to the embodiments described above, a portion of cooling flow through the hybrid skin core cooling cavities 906 will be drawn into the segment gaps 904 and ejected from the BOAS 900 as film cooling air through discharge holes 912. The discharge holes 912 that are aligned with the segment gaps 904 and fluidly connect the hybrid skin core cooling cavities 906 to an exterior surface of the BOAS 900 (e.g., the external side wall 908) to form film cooling along the exterior surface. For example, in this embodiment, the film cooling may be generated along the external side wall 908.

The BOAS 900 in the illustrations of FIG. 9A-9B is a double-wall BOAS design incorporating segmented ribs used to divide the circumferentially oriented hybrid cooling cavity channels. In some embodiments, the discharge holes can be cast-in or additively manufactured. Further, in some embodiments, the discharge holes can be incorporated into the BOAS as "stand alone features" and/or used in conjunction with multiple axially spaced rows of film cooling holes that are pitched in a predominately circumferential direction with variable film purge orientations based on external BOAS surface streamlines.

Advantageously, incorporating and forming discharge holes on an exterior surface of an airfoil, blade outer air seal (BOAS), or other hot section engine components, e.g., blade and vane end wall platforms, combustor panels, combustor shells, fuel injection nozzles, etc., at locations of segment gaps between rib segments, as shown and described herein, can eliminate dead zones within the airfoils as well as in other hot section engine components, including, but not limited to, blade and vane end wall platforms, BOAS, combustor panels, combustor shells, fuel injection nozzles, etc. Further, such discharge holes can draw/pull cooling flow from multiple hybrid skin core cooling cavities (e.g., adjacent hybrid skin core cooling cavities), thus increasing the local convective cooling while also maintaining the desired flow dynamics within the hybrid skin core cooling cavities. The additional cooling provided by the elimination of the dead zones, and the ejected cooling air, can increase the convective heat transfer at the location of the local "dead zones" (i.e., stagnated flow region) that exist between the segmented rib features, thus potentially completely eliminating any hot zones on the exterior surface of the airfoil or other hot section engine component. Advantageously, embodiments provided herein can reduce local thermal strains associated with high metal temperature gradients that may result in thermal mechanical fatigue cracks and increase durability of the airfoil.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   an airfoil body having an external side wall and an internal side wall and defining a first cooling cavity and a second cooling cavity between the external side wall and the internal side wall;
   at least one segmented rib extending within the airfoil body and separating the first cooling cavity from the second cooling cavity, wherein the first and second cooling cavities are defined between the external side wall and the internal side wall, the at least one segmented rib comprising at least two rib segments separated by a segment gap; and
   a discharge hole formed in the external side wall fluidly connecting the segment gap to an exterior surface of the airfoil body, wherein a center of the discharge hole is aligned with a radially oriented axis of the at least two rib segments that define the segment gap.

2. The airfoil of claim 1, wherein the at least one segmented rib comprises at least three rib segments and at least two segments gaps between the rib segments, the airfoil comprising at least one discharge hole located at each of the segment gaps.

3. The airfoil of claim 1, wherein:
the at least one segmented rib comprises a plurality of segmented ribs, and
the airfoil body comprises at least one additional cooling cavity.

4. The airfoil of claim 1, wherein the discharge hole is angled relative to the exterior surface of the airfoil body.

5. The airfoil of claim 1, wherein the airfoil body is a body of hot section engine airfoil.

6. The airfoil of claim 1, wherein a portion of cooling air within the first cooling cavity and a portion of cooling air within the second cooling cavity are ejected from a respective cooling cavity through the discharge hole.

7. The airfoil of claim 1, wherein the external side wall is at least one of a pressure sidewall and a suction side wall of the airfoil body.

8. The airfoil of claim 1, wherein at least one of the first cooling cavity and the second cooling cavity fluidly discharges out of a tip of the airfoil body.

9. The airfoil of claim 1, wherein the segment gap has a radial gap size h, the rib segments have a local thickness t, and the discharge hole has a hydraulic diameter Dh, and the radial gap size h is defined as $2t \leq h \leq 4t$ or $2Dh \leq h \leq 4Dh$.

10. A method of manufacturing an airfoil for a gas turbine engine, the method comprising:
forming an airfoil body having an external side wall and an internal side wall;
forming at least one segmented rib within the airfoil body, the at least one segmented rib separating a first cooling cavity from a second cooling cavity within the airfoil body, wherein the first cooling cavity and the second cooling cavity are defined between the external side wall and the internal side wall, the segmented rib comprising at least two rib segments separated by a segment gap; and
forming a discharge hole in the external side wall to fluidly connect the segment gap to an exterior surface of the airfoil body, wherein a center of the discharge hole is aligned with a radially oriented axis of the at least two rib segments that define the segment gap.

11. The method of claim 10, wherein the at least one segmented rib comprises at least three rib segments and at least two segments gaps between the rib segments, the method comprising forming at least one discharge hole at each of the segment gaps.

12. The method of claim 10, wherein:
the at least one segmented rib comprises a plurality of segmented ribs, and
the airfoil body is formed with at least one additional cooling cavity.

13. The method of claim 10, wherein the discharge hole is angled relative to the exterior surface of the airfoil body.

14. The method of claim 10, wherein the airfoil body is a body of a hot section engine airfoil.

15. The method of claim 10, wherein a portion of cooling air within the first cooling cavity and a portion of cooling air within the second cooling cavity are ejected from a respective cooling cavity through the discharge hole.

16. The method of claim 10, wherein the external side wall is at least one of a pressure sidewall and a suction sidewall of the airfoil body.

17. The method of claim 10, wherein at least one of the first cooling cavity and the second cooling cavity fluidly discharges out of a tip of the airfoil body.

18. The method of claim 10, wherein the airfoil body is formed using at least one of fugitive core technologies and additive manufacturing processes.

19. The method of claim 10, wherein the segment gap has a radial gap size h, the rib segments have a local thickness t, and the discharge hole has a hydraulic diameter Dh, and the radial gap size h is defined as $2t \leq h \leq 4t$ or $2Dh \leq h \leq 4Dh$.

* * * * *